United States Patent [19]

Wu

[11] Patent Number: 5,321,590
[45] Date of Patent: Jun. 14, 1994

[54] HEADLIGHT ADJUSTING DEVICE

[76] Inventor: Chun C. Wu, No. 72-2, Hsin Le Rd.,, Tainan, Taiwan

[21] Appl. No.: 72,438

[22] Filed: Jun. 7, 1993

[51] Int. Cl.⁵ .............................................. B60Q 1/06
[52] U.S. Cl. ................................... 362/66; 362/273; 362/289; 362/421; 362/424
[58] Field of Search ................. 362/66, 273, 289, 423, 362/424, 420, 421

[56] References Cited

U.S. PATENT DOCUMENTS

| | | | |
|---|---|---|---|
| 4,674,018 | 6/1987 | Ryder et al. | 362/424 |
| 4,713,739 | 12/1987 | Ryder et al. | 362/424 |
| 5,165,775 | 11/1992 | Lisak et al. | 362/66 |

FOREIGN PATENT DOCUMENTS 0195441  4/1983  Japan ..................................... 362/66

Primary Examiner—Ira S. Lazarus
Assistant Examiner—Sara S. Raab
Attorney, Agent, or Firm—William E. Pelton

[57] ABSTRACT

A vehicle headlight adjusting device includes a housing, a rotational member rotatably received in the housing, an adjusting screw with an end thereof coupled to a vehicle headlight to move therewith and passing through the housing and a threaded through hole in the rotational member, and a drive shaft with a gear securely coupled to an end thereof for engaging with annular teeth on the rotational member, whereby a rotational movement of the drive shaft is transformed into a linear movement of the adjusting screw to adjust the position of the vehicle headlight.

4 Claims, 7 Drawing Sheets

HEADLIGHT ADJUSTING DEVICE

BACKGROUND OF THE INVENTION

The present invention relates to a headlight adjusting device for vehicles.

Currently there are many adjusting mechanisms proposed to adjust the position of the vehicle headlights. U.S. Pat. No. 4,674,018 to Ryder et al. issued on Jun. 16, 1987 discloses a headlight adjusting mechanism in this regard. Such a mechanism is, however, time-consuming and high in cost in manufacturing due to being complicated. The present invention provides an improved adjusting device to solve this problem.

SUMMARY OF THE INVENTION

In one aspect the present invention, a vehicle headlight adjusting device includes a housing means, a rotational means rotatably received in the housing means, an adjusting screw with an end thereof coupled to a vehicle headlight to move therewith and passing through the housing means and a threaded through hole in the rotational member, and a drive shaft with a gear securely coupled to an end thereof for engaging with annular teeth on the rotational means, whereby rotation of the drive shaft is transformed into a linear movement of the adjusting screw to adjust the vertical or horizontal position of the vehicle headlight.

The rotational means includes a rotor body having a hexagonal block projecting from a first side thereof and a threaded through hole extending longitudinally and a disc having annular teeth extending outward from a side thereof and a hexagonal opening to be securely mounted around the hexagonal block of the rotor body to rotate therewith.

Preferably, the housing means consists of two half housings having holes to allow the adjusting screw to pass through and snapping members and corresponding holes are respectively formed on the two half housings to provide a releasable engagement therebetween.

In another aspect of the present invention, a vehicle headlight adjusting device comprises an adjusting screw with an end thereof adapted to be coupled to a vehicle headlight, a housing means, a rotational means rotatably received in the housing means and including annular teeth extending outward from a side thereof and a receiving hole extending along a longitudinal axis thereof to securely engage with the other end of the adjusting screw so as to rotate therewith, a drive shaft with a gear securely coupled to an end thereof for engaging with the annular teeth of the rotational means, a movable seat which is integral with the vehicle headlight and in threading connection with the adjusting screw, whereby rotation of the adjusting screw upon rotation of the drive shaft is transformed into a pivotal movement of the vehicle headlight.

The rotational means includes a rotor body having a hexagonal block projecting from a first side thereof and a receiving hole extending longitudinally for securely receiving the other end of the adjusting screw and a disc having annular teeth extending outward from a side thereof and a hexagonal opening to be securely mounted around the hexagonal block of the rotor body to rotate therewith.

The housing means includes two half housings one of which has a hole to allow the other end of the adjusting screw to pass through to engage with the receiving hole of the rotor body.

Other objects, advantages, and novel features of the invention will become more apparent from the following detailed description when taken in conjunction with the accompanying drawings.

DETAILED DESCRIPTION OF THE PREFERRED EMBODIMENTS

Figure 1:
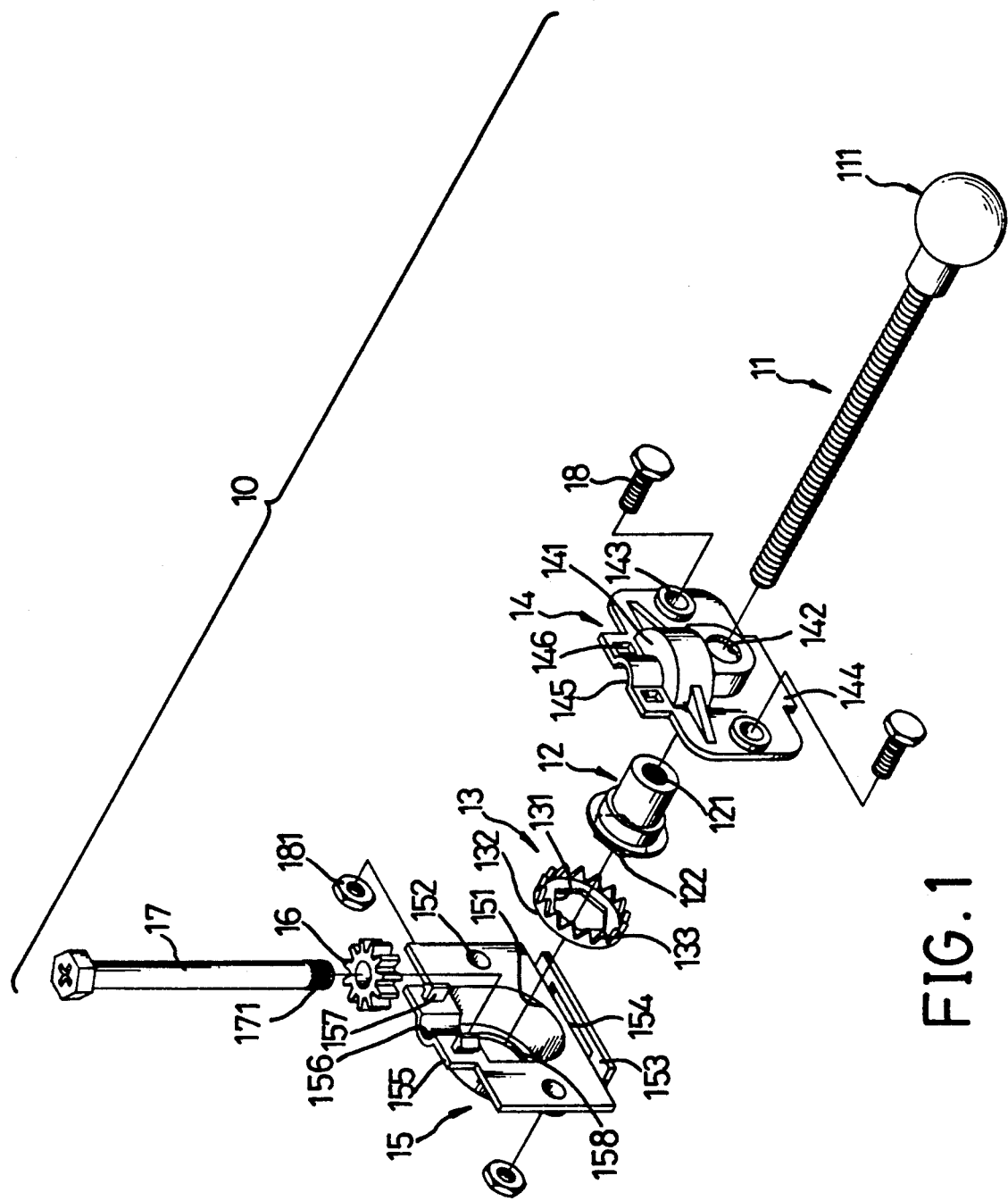
FIG. 1 is an exploded view of a first embodiment of a headlight adjusting device in accordance with the present invention.
Figure 2:
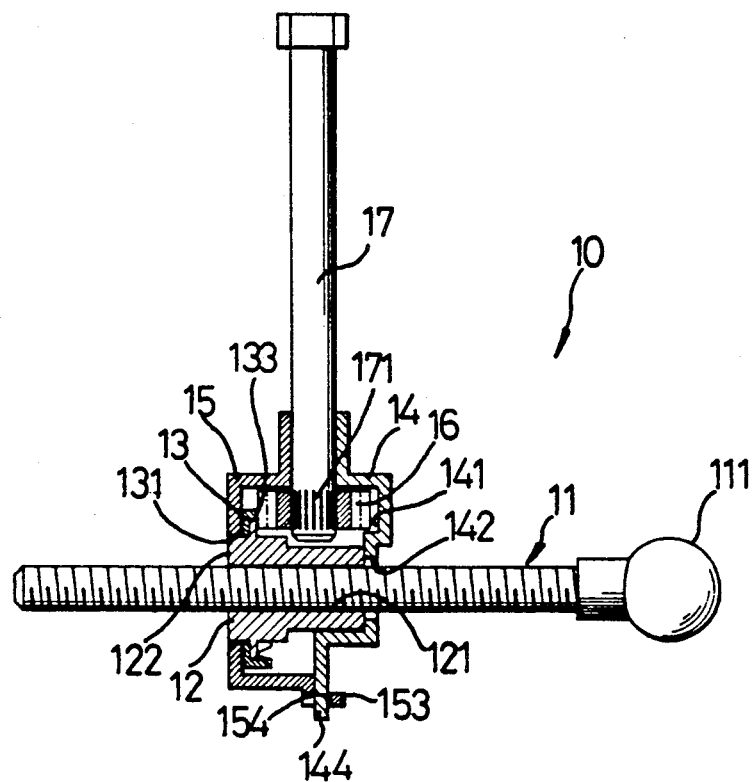
FIG. 2 is a cross-sectional view of the headlight adjusting device in FIG. 1.
Figure 3:
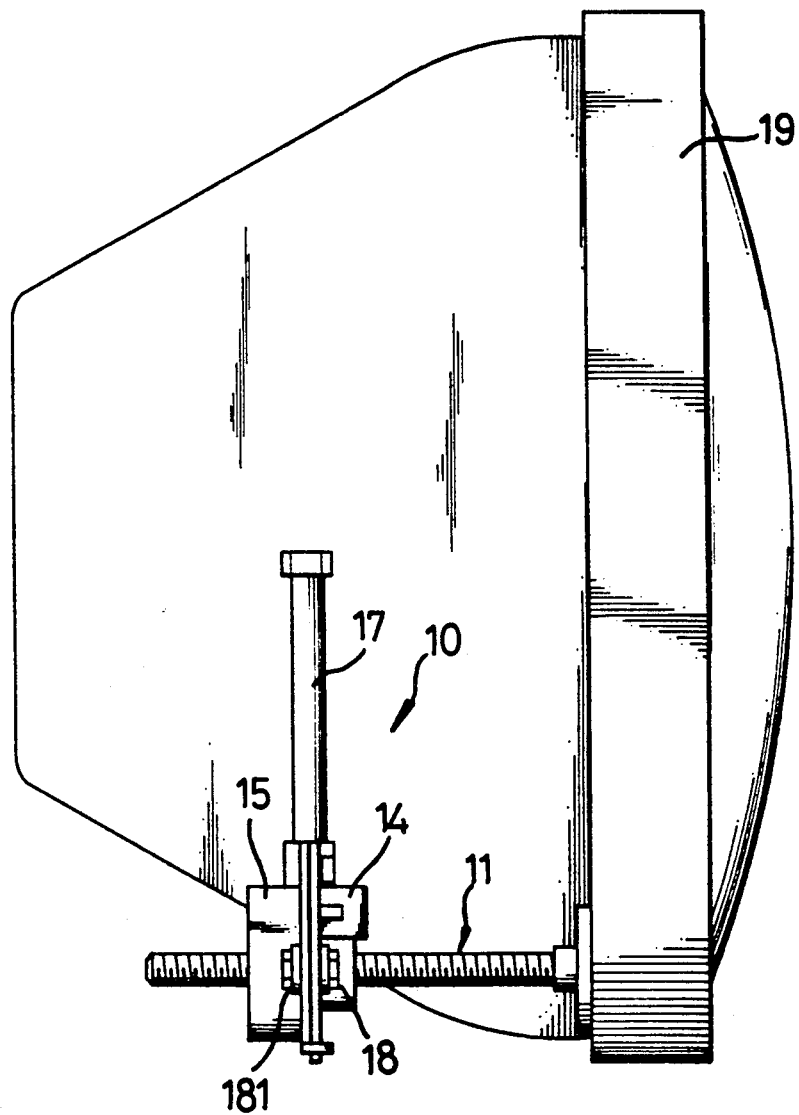
FIG. 3 is a side view of the headlight adjusting device attached to a vehicle headlight.

Referring to the drawings and initially to FIGS. 1 through 3, a headlight adjusting device 10 in accordance with a first embodiment of the present invention generally includes an adjusting screw 11 with a ball coupler end 111 coupled to a vehicle headlight 19 (see FIG. 3), a housing means consisting of two half housings 14 and 15 secured together by nuts 181 and bolts 18 in holes 143 and 152 therein, a rotational means rotatably received in the housing means, and a drive shaft 17 with a gear 16 securely coupled to an end 171 thereof.

The rotational means includes a rotor body 12 which is stepped at an outer peripheral thereof and has a hexagonal block 122 projecting from a first side thereof and a threaded through hole 121 extending longitudinally. The rotational means also includes a gear member 13 which has a disc 132 with annular teeth 133 extending outward from a side thereof. The disc 132 has a hexagonal opening 131 to be securely mounted around the hexagonal block 122 so as to rotate therewith. Alternatively, the rotor body 12 and the gear member 13 may be made as a one-piece member.

Half housings 14 and 15 generally include recessed portions 141 and 151 so as to rotatably receive the rotational means and the gear 16. Half housings 14 and 15 further include concave structures 145 and 156 to rotatably receive the drive shaft 17. Half housing 14 further has a hole 142 below the recessed portion 141 to allow the adjusting screw 11 to pass through. Half housing 15 also has a hole 158 to accommodate the hexagonal block 122 of the rotational means. In addition, half housing 14 has an insert 144 projecting downward from a bottom thereof and half housing 15 has a corresponding slot 154 in a plate 153 which extends from a bottom thereof to engage with the insert 144 of half housing 14. In addition to the holes 143 and 152 and bolts 18 and nuts 181, snapping members 157 may be formed on half housing 15 and corresponding holes 146 may be formed in half housing 14 to provide a releasable yet secure engagement relationship therebetween.

When assembling, the rotational means, i.e., the rotor body 12 and the gear member 13 are placed into the recessed portion 151 of half housing 15 with the hexagonal block 122 engaged in hole 131. Thereafter, the gear 16 is placed above the rotor body 12 to mesh with the teeth 133 of the disc 132. Then, the insert 144 of half housing 14 is inserted into the slot 154 of half housing 15 and the snapping members 157 are snapped into holes 146 in half housing 14, and bolts 18 and nuts 181 are provided to fasten the half housings 14 and 15. Subsequently, the end 171 of the drive shaft 17 is inserted into the housing means to securely engage with the gear 16. The ball coupler end 111 of the adjusting screw 11 is coupled to a lower right corner of a rear side of a vehicle headlight 19 as previously described.

In operation, rotation of the drive shaft 17 causes the gear 16 to rotate, which, in turn, rotates the rotor body 12 via transmission of the teeth 133 of the disc 132. Accordingly, the adjusting screw 11 moves linearly along a longitudinal axis thereof to horizontally pivot the headlight 19 through a desired arc, thereby adjusting the horizontal position of the headlight 19. It is appreciated that another adjusting device may be coupled to a middle top portion of the rear side of the headlight to adjust the vertical position of the headlight. In this embodiment, most of the length of the adjusting screw 11 is threaded, in practice, it can be threaded for only that portion thereof which approximates the threaded hole 121 of the rotor body 12.

Figure 4:
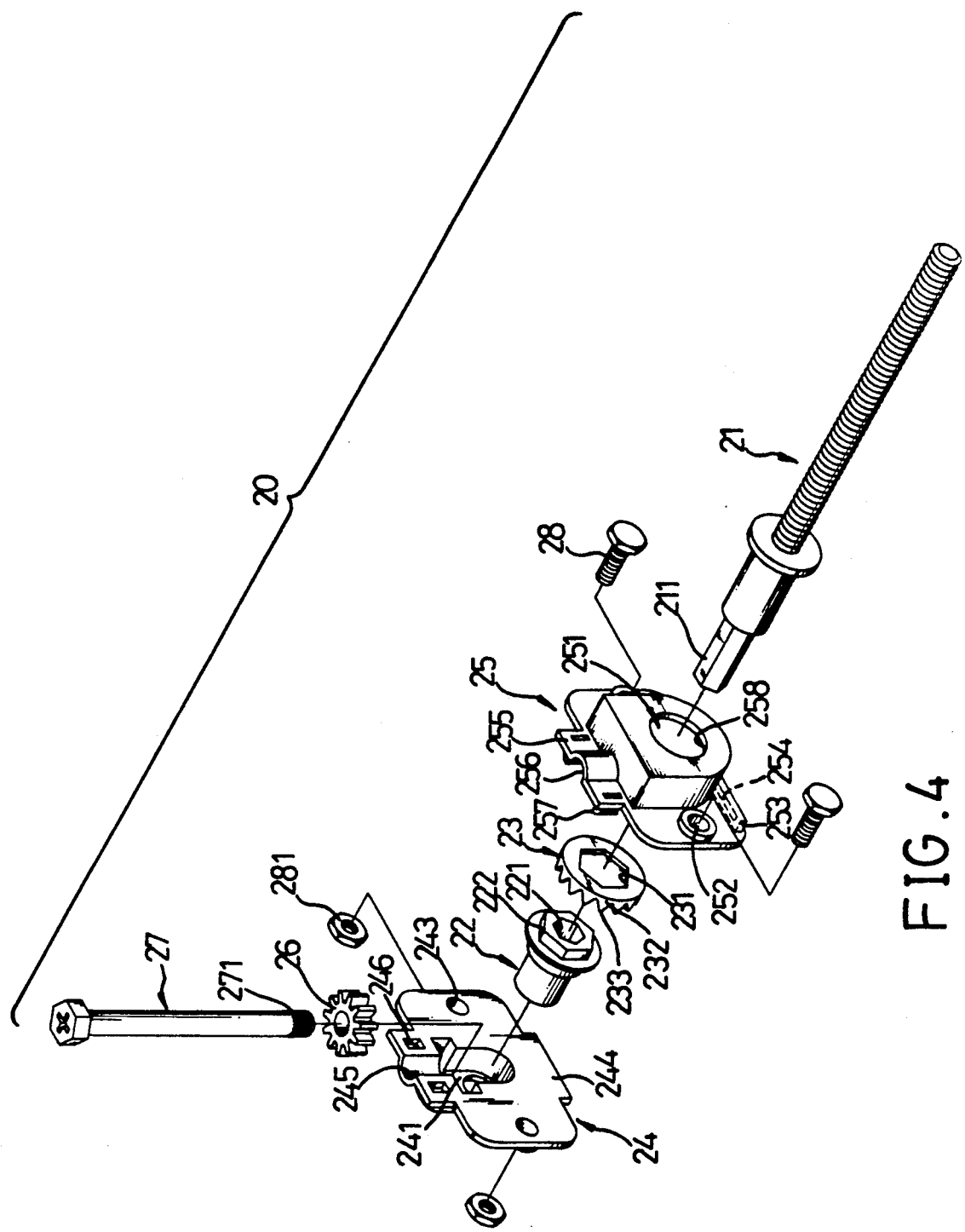
FIG. 4 is an exploded view of a second embodiment of a headlight adjusting device in accordance with the present invention.
Figure 5:
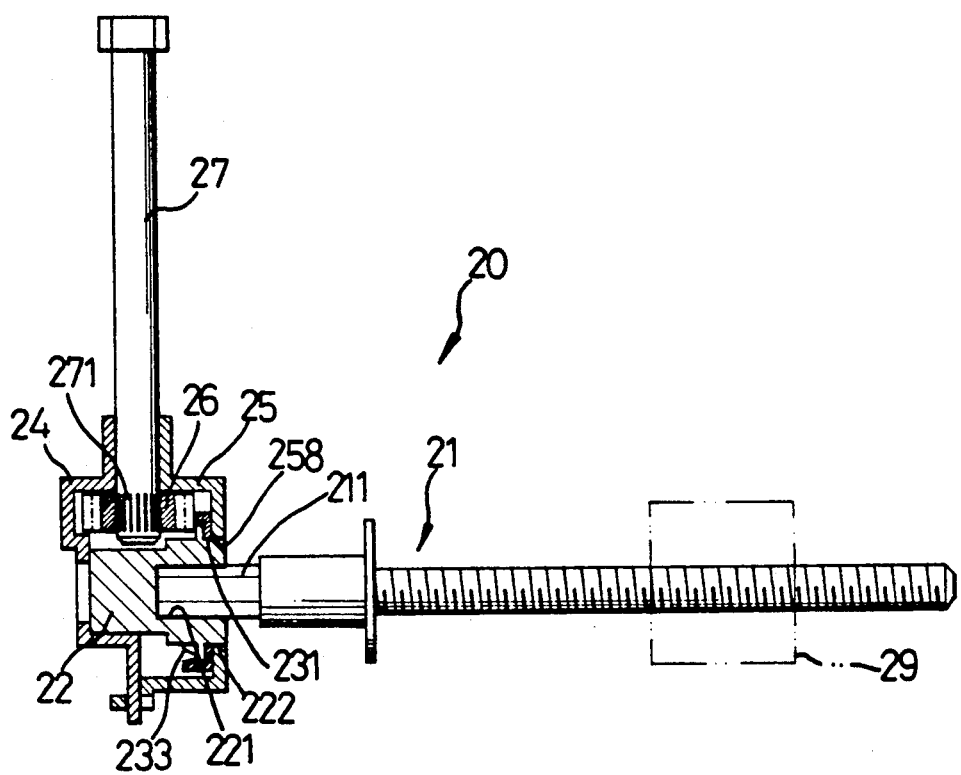
FIG. 5 is a cross-sectional view of the headlight adjusting device in FIG. 4.

FIGS. 4 and 5 show a second embodiment of the adjusting device in accordance with the present invention, in which the reference numerals designating like elements in FIGS. 1 through 3 have been changed in the first reference digit, e.g., the reference numerals for half housings "14" and "15" in FIGS. 1 through 3 have been changed to "24" and "25". As to FIGS. 6 and 7 which show a third embodiment of the present adjusting device, the first reference characters therein have been changed to "3".

The structure of the adjusting device in FIGS. 4 and 5 are substantially the same as that illustrated in FIGS. 1 through 3 except for the following differences: (1) though still shown in FIGS. 4 and 5, the hole 142 in half housing 14 in FIGS. 1 through 3 may be omitted in the second embodiment; (2) the hole 221 in the rotor body 22 is hexagonal in section and is not a through hole; and (3) the adjusting screw 21 includes an end 211 which is hexagonal in section to be fittingly and securely received in the hole 221 in the rotor body 22, and the adjusting screw 21 is in threading connection with a movable seat 29 which is integral with the vehicle headlight (not labeled). In operation, rotation of the drive shaft 27 causes the gear 26 to rotate, which, in turn, rotates the rotor body 22 via transmission of the teeth 233 of the disc 23. Accordingly, the adjusting screw 11 rotates to actuate the movable seat 29 to move linearly along a longitudinal axis thereof to pivot the headlight, thereby adjusting the horizontal or vertical position of the headlight.

Figure 6:
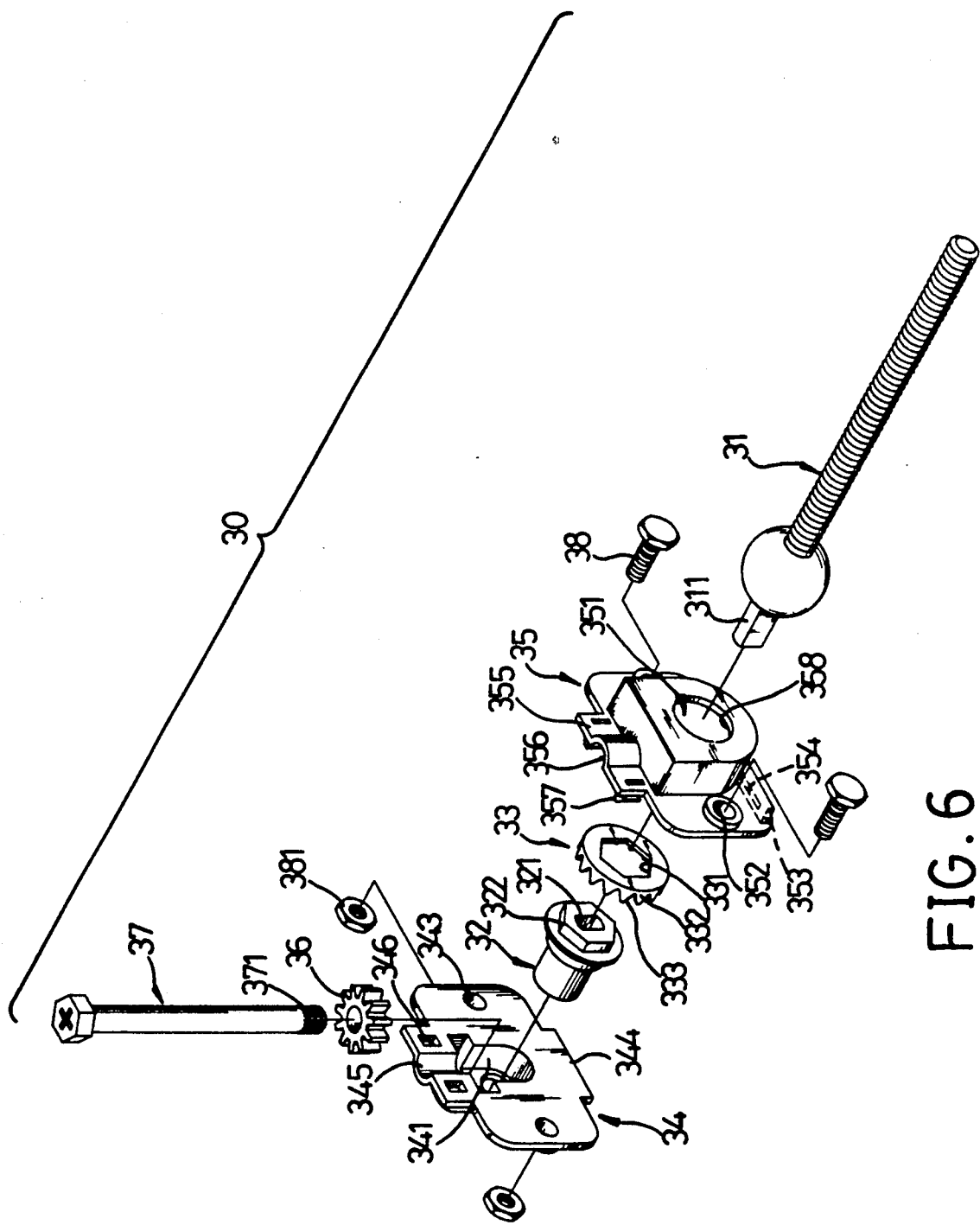
FIG. 6 is an exploded view of a third embodiment of a headlight adjusting device in accordance with the present invention.
Figure 7:
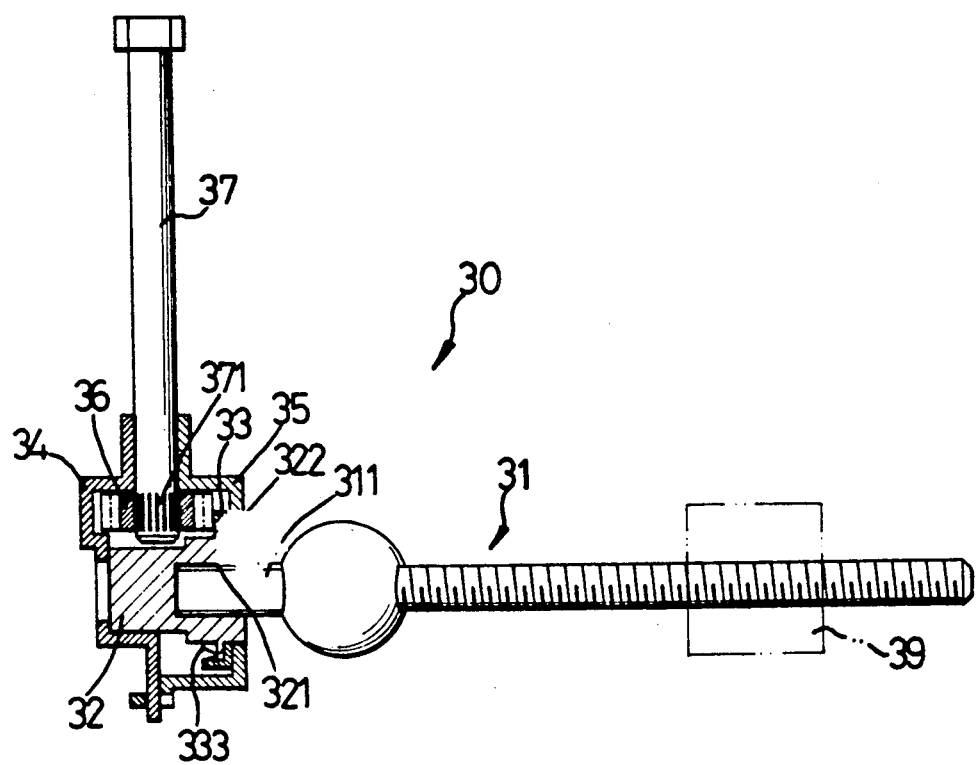
FIG. 7 is a cross-sectional view of the headlight adjusting device in FIG. 6.

The structure of the adjusting device in FIGS. 6 and 7 is substantially the same as that illustrated in FIGS. 4 and 5 except that (1) the hole 321 in the rotor body 32 is substantially rectangular in section and (2) the adjusting screw 31 includes an end 311 which is also substantially rectangular in section to be fittingly and securely received in the hole 321 in the rotor body 32, and the adjusting screw 31 is in threading connection with a movable seat 39 which is integral with the vehicle headlight (not labeled). Operation of the third embodiment is the same as that disclosed in the above and therefore is not redundantly described.

Although the invention has been explained in relation to its preferred embodiment, it is to be understood that many other possible modifications and variations can be made without departing from the spirit and scope of the invention as hereinafter claimed.

I claim:

1. A vehicle headlight adjusting device comprising:

an adjusting screw with an end thereof adapted to be coupled to a vehicle headlight to move therewith;

housing means including first and second half housings which have aligned holes therein to allow said adjusting screw to pass through, snapping members and corresponding holes being respectively formed on said first and second half housings to provide a releasable engagement therebetween, said first half housing having an insert projecting downward from a bottom thereof and said second half housing having a corresponding slot in a plate which extends from a bottom thereof to engage with said insert;

rotational means rotatably received in said housing means, said rotational means including a rotor body having a hexagonal block projecting from a first side thereof and a longitudinally extended threaded through hole;

a disc having annular teeth extending outward from a side thereof and a hexagonal opening to be securely mounted around said hexagonal block of said rotor body to rotate therewith; and a drive shaft with a gear securely coupled to an end thereof for engaging with said annular teeth means of said rotational means, whereby rotation of said drive shaft is transformed into a linear movement of said adjusting screw.

2. A vehicle headlight adjusting device comprising:

an adjusting screw with an end thereof adapted to be coupled to a vehicle headlight;

housing means including two half housings on which snapping members and corresponding holes are respectively formed to provide a releasable engagement therebetween, one of said half housings having an insert projecting downward from a bottom thereof and the other said half housing having a corresponding slot in a plate which extends from a bottom thereof to engage with said insert;

rotational means rotatably received in said housing means, said rotational means including annular teeth means extending outward from a side thereof and a hole extending along a longitudinal axis thereof through to securely engage with the other end of said adjusting screw so as to rotate therewith;

a drive shaft with a gear securely coupled to an end thereof for engaging with said annular teeth means of said rotational means; and a movable seat integral with the vehicle headlight and in threading connection with said adjusting screw, whereby rotation of said adjusting screw upon rotation of said drive shaft is transformed into a pivotal movement of said vehicle headlight.

3. The vehicle headlight adjusting device as claimed in claim 2 wherein said rotational means includes:

a rotor body having a hexagonal block projecting from a first side thereof and a receiving hole extending longitudinally for securely receiving said other of said adjusting screw; and a disc having a plurality of teeth extending outward from a side thereof and a hexagonal opening to be securely mounted around said hexagonal block of said rotor body to rotate therewith.

4. The vehicle headlight adjusting device as claimed in claim 3 wherein said housing means has a hole in one side thereof to allow said other end of said adjusting screw to pass through to engage with said receiving hole of said rotor body.

* * * * *